United States Patent
Wu et al.

(10) Patent No.: US 9,179,043 B2
(45) Date of Patent: Nov. 3, 2015

(54) OBTAINING USER PREFERENCES USING CATEGORIES OF IMAGES

(71) Applicant: Xerox Corporation, Norwalk, CT (US)

(72) Inventors: Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 471 days.

(21) Appl. No.: 13/655,516

(22) Filed: Oct. 19, 2012

(65) Prior Publication Data

US 2014/0111538 A1    Apr. 24, 2014

(51) Int. Cl.
  G09G 5/00    (2006.01)
  G09G 5/02    (2006.01)
  G06F 3/048   (2013.01)
  H04N 1/60    (2006.01)

(52) U.S. Cl.
  CPC ............ *H04N 1/6013* (2013.01); *H04N 1/603* (2013.01)

(58) Field of Classification Search
  CPC combination set(s) only.
  See application file for complete search history.

(56) References Cited

U.S. PATENT DOCUMENTS

| | | | |
|---|---|---|---|
| 5,300,974 A | 4/1994 | Stephenson, III | |
| 5,495,539 A | 2/1996 | Sieverding | |
| 6,032,004 A | 2/2000 | Mirabella, Jr. et al. | |
| 7,023,448 B1 | 4/2006 | Danciu | |
| 7,187,799 B2 | 3/2007 | Braun | |
| 7,190,831 B2 | 3/2007 | Braun | |
| 7,196,735 B2 | 3/2007 | Braun | |
| 7,328,116 B2 | 2/2008 | Bala et al. | |
| 7,606,412 B2 | 10/2009 | Huh et al. | |
| 7,796,296 B2 | 9/2010 | Martinez et al. | |
| 7,835,576 B2 | 11/2010 | Kang et al. | |
| 8,866,841 B1 * | 10/2014 | Distler | 345/619 |
| 2004/0013298 A1 | 1/2004 | Choe et al. | |
| 2007/0250705 A1 * | 10/2007 | Smith et al. | 713/157 |
| 2008/0007749 A1 | 1/2008 | Woolfe | |
| 2008/0049025 A1 * | 2/2008 | Le Tuan | 345/473 |
| 2010/0085377 A1 | 4/2010 | Woolfe | |
| 2011/0105879 A1 * | 5/2011 | Masumoto | 600/407 |

* cited by examiner

Primary Examiner — Wesner Sajous
(74) Attorney, Agent, or Firm — Gibb & Riley, LLC (57) ABSTRACT

Methods and systems present, to a user, different versions of sample images. Each of the sample images is classified into at least one image-element category of multiple image-element categories. Such methods and systems request the user to select preferred versions of the sample images from the different versions of the sample images, and receive in response a user selection of preferred images. The methods and systems determine user-specific preferences for each of the image-element categories based on the user selection of the preferred images. The methods and systems receive an image-processing request relating to user images from the user, and classify the user images into the image-element categories. When processing the image-processing request, the methods and systems alter renditions of the user images according to the user-specific preferences for each image-element category.

25 Claims, 6 Drawing Sheets

OBTAINING USER PREFERENCES USING CATEGORIES OF IMAGES

BACKGROUND

Embodiments herein generally relate to obtaining image rendition preferences from users and more particularly to methods and systems that substantially limit the number of images needed to be reviewed by the user by utilizing classes of images.

Digital printing provides the ability to have short-run jobs at much lower page-cost than traditional analog (e.g., lithographic) printing. This enables a significant market segment called one-to-one (1-1) printing for highly personalized print jobs. Examples are photo books and book on-demand. For photo books, color rendition is known to be a factor for customer satisfaction. Current practices address color rendition via "opinion of majority" or "expert opinion." However, color rendition is highly subjective, and individual customers have their own preferences. For critical jobs, artists may work with complicated workflows that use very precise soft-proofing or hard-proofing techniques. However, non-professional photo book customers are generally simply provided an average "best" color rendition according to the opinion of the majority of users.

SUMMARY

An exemplary method herein receives an image-processing request relating to user images from a user into a graphic user interface of a computerized device. Such images can be any form of visual item, whether currently known or developed in the future, that can be output from a digital device (via graphic user interface, printer, input/output port, etc.). Therefore, for example, such "images" can be photographs, hand drawings/paintings, computer generated graphics, presentations, documents, screenshots, video, etc.

This method can classify the user images into image-element categories using a processor of the computerized device. The computerized device can also automatically obtain or select sample images that correspond to such image-element categories. The sample images can be taken from the images within the image-processing request (or a subset thereof), or can be standardized images that are different from the user images. Each of the sample images can represent at least one different image-element category. This process also can limit the sample images to only the image-element categories of the user images presented in the image-processing request.

When selecting a set of sample images, the user images can be classified based on image-element categories contained therein. In addition, when using a subset of the user images, each of the sample images represents at least one image-element category of the image-element categories.

This method then presents, to the user, different versions of the sample images through the graphic user interface and requests the user to select preferred versions of the sample images from the different versions of the sample images, using the graphic user interface. This can include providing natural-language choices to select from among the different versions of the sample images. In some embodiments, each of the different image-element categories can be represented by only one category-specific sample image, and different versions of each category-specific sample image are included in the sample images.

In response, this method receives one or more user selections of preferred images, through the graphic user interface (this can include receiving natural-language choices). Also, this process can be iterative, with each user selection providing different or more specific image rendition preferences.

The user selection of preferred versions can be an iterative process, and the different versions of the sample images can be generated by varying the selected color rendition parameters according to preselected values or can be generated according to changes in color rendition parameters specified by the user. Such changes in color rendition parameters can be specified by the user using graphical user-interface controls and/or natural language processing. Also, the multiple image-element categories can include human portraits, sky, grass, foliage, ocean and river scenes.

Further, this method determines user-specific preferences for each different image-element category based on the preferred images selected by the user, using the processor. The user-specific preferences are different for each user that selects the preferred images through the graphic user interface. Subsequently, this method can process the image-processing request using the processor, and during such processing, the method alters the rendition of the user images according to the user-specific preferences for each the different image-element category. Such processing of the image-processing request can include printing the user images, displaying the user images, etc., using the altered renditions of the images.

When altering the renditions of the user images according to the user-specific preferences, this process can modify the color rendition profile locally from original color values (e.g., lightness, chroma, and hue) of the image-element categories to the user-specific preferences via a smooth mapping process. The smooth mapping process can include, for example, a locally-weighted regression (LOESS model), a sigmoid function which changes values smoothly around pre-specified center values while leaving values away from the centers unchanged, etc.

A computerized device embodiment herein comprises a processor, a graphic user interface operatively connected to the processor, a printer, etc. The graphic user interface presents different versions of category-specific sample images to a user. The processor can limit the number of sample image presented to the user to less than a previously established number. The graphic user interface requests the user to select preferred versions of the sample images from the different versions of the sample images. In response, the graphic user interface receives a user selection of preferred images. The processor determines user-specific preferences for each the different image-element category based on the user selection of the preferred images.

Before or after such processing, the graphic user interface can receive an image-processing request relating to user images from the user. The processor classifies the user images into the image-element categories. The processing of the image-processing request alters the renditions of the user images according to the user-specific preferences for each the different image-element category.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, color rendition is highly subjective, and while professionals may work with complicated, elaborate soft-proofing or hard-proofing techniques, non-professional customers are generally provided with only an average "best" color rendition that matches the opinion of the majority of users (but which may not comply with a specific individual's color preferences). Therefore, the embodiments herein provide a simple but effective indirect soft-proof method to capture individual customer's preference and thus improve customer satisfaction. In particular, the systems and methods herein determine color rendition techniques such as preferred memory color and skin tone rendition, and can provide a natural language color editor to obtain such color preferences.

Figure 1:
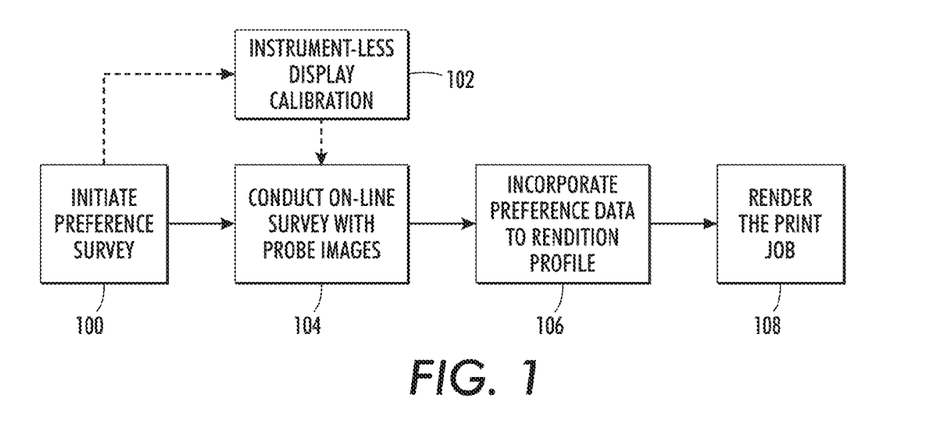
FIG. 1 is a flow diagram illustrating features of various embodiments herein.

More specifically, the systems and methods herein provide a novel indirect subjective soft-proof system and method for 1-1 printing applications such as typical photo printing (e.g. 3×5, 4×6 etc.), on-line photo book ordering, etc. FIG. 1 depicts an example system flowchart for the systems and methods herein. In item 100, the user is prompted to participate in a simple preference survey. A customer display color characterization is performed in item 102. For example, in item 102, the customer display can be assumed to be in the standard sRGB space. Optionally, the customer can be prompted to perform a simple instrument-less display calibration procedure in item 102. In situations where a customer is capable of performing a better display calibration using a color measurement instrument, item 102 can be replaced with such a procedure. While some conventional calibration processes are mentioned here, those ordinarily skilled in the art would understand that any calibration process (whether currently known or developed in the future) could be used with embodiments herein.

In item 104, appropriate probe images with various color renditions (CR) are used for conducting a subjective preference survey in order to extract customer CR preference parameters. Thus, during the survey in item 104, the systems and methods herein present, to the user, different color versions of one or more sample color images (probe images) through the graphic user interface, and request the user to select preferred color versions of the sample color images.

In item 106 extracted CR preference parameters are incorporated into the creation of a job-specific color rendition profile to implement subjective preferences using technologies such as preferred memory color and skin tone rendition, and can use a natural language color editor. Finally, in item 108, this custom job can be printed with the resulting profile. With the systems and methods herein, it is possible to improve customer satisfaction by rendering the customer's job with color rendition that aligns better with their individual preferences, rather than the average opinion of a given population.

The term indirect comes from the fact that the systems and methods herein may not always use all customer images directly to obtain customer preferences, since typically there could be too many customer images. With a small but appropriate set of sample or probe images, the systems and methods herein can get the needed information of subjective preference without a time-consuming soft-proofing of all customer images.

As mentioned above, the systems and methods herein initiate a simple preference survey in item 100. In this step, the systems and methods herein prompt the customer to participate in a simple preference survey to improve the quality of their submitted job. Considering the potential benefit to the customer, and the amount of time needed to complete the survey, a motivation may be provided in step 100. In one embodiment, a small incentive may be offered for participation. In another embodiment, a preferred survey method can be chosen by the customer (e.g., multiple choice visual approach vs. descriptive natural language editing approach).

Figure 2:
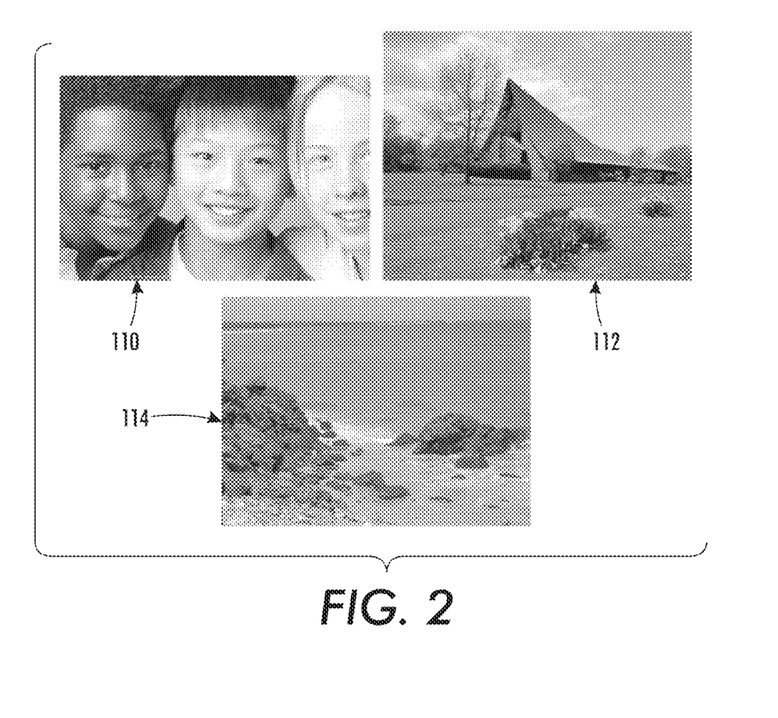
FIG. 2 presents images illustrating features of various embodiments herein.

In item 104, the systems and methods herein conduct a color rendition preference survey using a set of probe images. In this step, the systems and methods herein utilize a set of probe images such as 110, 112, 114 and a simple online survey approach to collect customer preference on color rendition. Example probe images 110, 112, 114 are shown in FIG. 2, where skin tone (image 110), sky and grass (image 112), ocean scene (image 114) are used to identify the customer's rendition preference.

In one embodiment, the set of probe images is fixed for all customers and all jobs. Such a fixed set covers typical skin tones and typical outdoor memory colors (see FIG. 2) and may include human portraits, sky, grass, foliage, ocean and river scenes etc (these classes of objects may be referred to as image categories or attributes). In another embodiment, only a subset of a fixed database of probe images is used based on analyses of the images that were uploaded by the customer for a particular job (for example, only ocean scenes). In yet another embodiment, the probe images are generated (via image retrieval and query of a large image database) based on analyses of the images that were uploaded by the customer for a particular job. In yet another embodiment, the probe images are simply a subset of the customer's images, automatically chosen to be representative of the full set of images by analysis of the image content. In yet another embodiment, if the total number of images uploaded by the user is small (say <5), lower resolution versions of all customer images are used as probe images directly. Each probe image should contain at least one of the image categories, such as mentioned above. That is, it can contain more than one image category. For example, 110 contains only human portraits while 112 contain both sky and grass. If a plurality of image categories is contained in each probe image, fewer probe images are needed to cover all image categories of interest. On the other hand, multiple probe images may be used to cover a single image category for robustly extracting customer's CR preference. In such cases, statistical values (e.g., averages) of the survey results for a given image category will be used.

The reason that the systems and methods herein should have multiple (but as few as possible) probe images is that the systems and methods herein desire to collect preferred renditions on those critical categories that are essential to the quality of pictorial images such as skin tone, grass, skin, water (beach or river), sand etc. The preference can be different for each category for each individual. For example, some customers prefer lighter and whiter rendering of skin tones than do others. Some customers like blue skies that are slightly green-shade, while others like slightly red-shade skies. But the systems and methods herein do not need to have images of a large number of different views of sky or faces to determine one person's preference. This justifies the use of a small but representative set of probe images for such a task.

Figure 3:
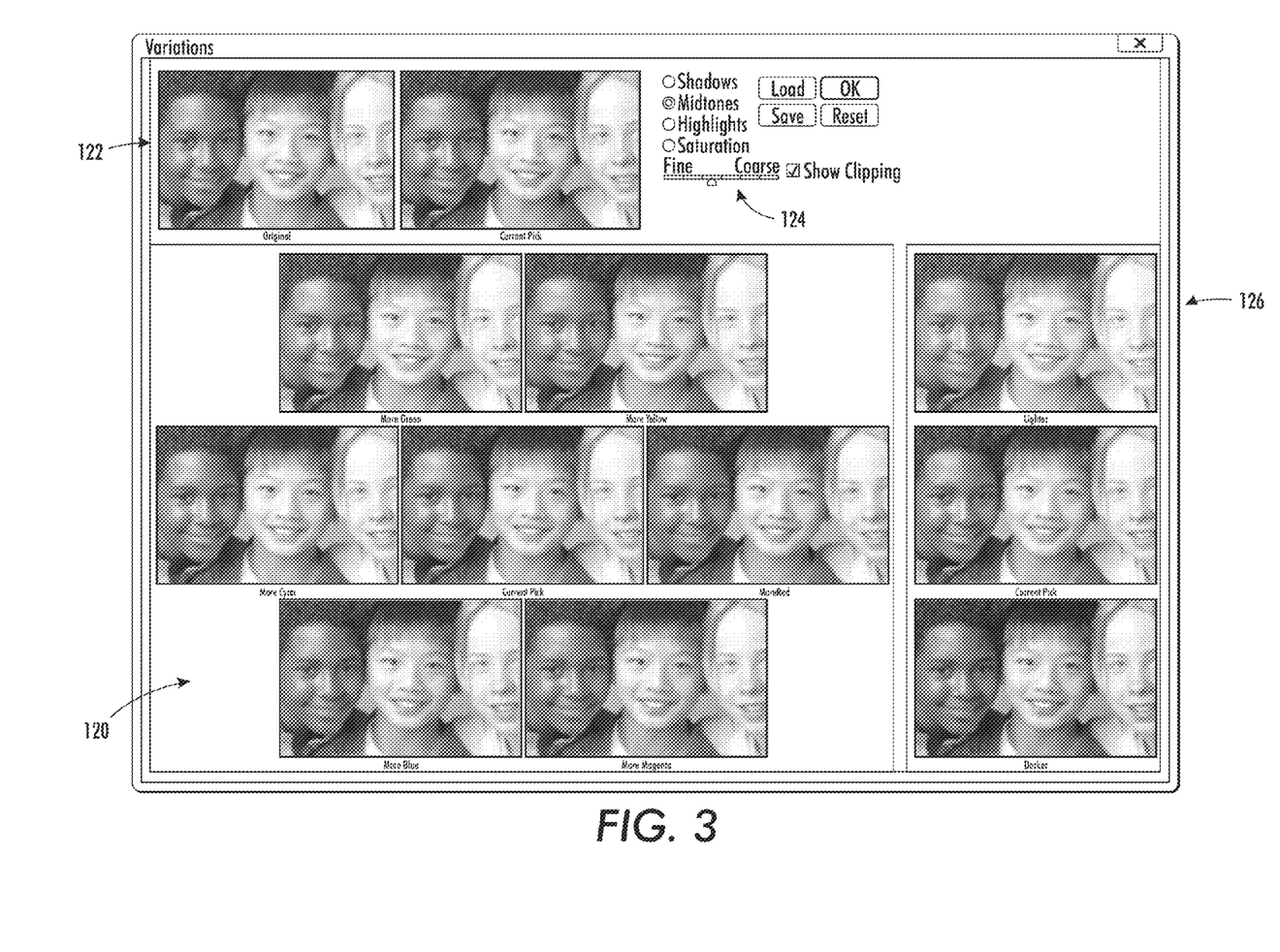
FIG. 3 is a screen shot illustrating features of various embodiments herein.

For a color rendition survey, one method herein presents a single trial "ring-around" of multiple choices for each probe image, as shown in FIG. 3. More specifically, the ring of photos 120 includes a current selection at the center, with photos showing more green, more yellow, more red, more magenta, more blue, more cyan, etc., surrounding the current pick. Alternatively the ring-around may contain variations in terms of color parameters, such as positive and negative shifts in $L^*$, $a^*$ and $b^*$. This allows users to select the preferred color direction for each type of probe image, simply by clicking on one of the choices in the ring 120. The ring-around approach can be iterative, to get successively finer increments in the chosen parameters, or to more specifically focus the user's preferences or to obtain other preferences (e.g., contrast) using successive rings of images. The graphic user interface can also display the original image next to the current selection (shown by item 122) and can show the current selection against lighter and darker versions as shown by item 126. Providing such a graphic user interface selection to the user allows the user to change the colorization of the probe image in a matter of seconds.

Figure 4:
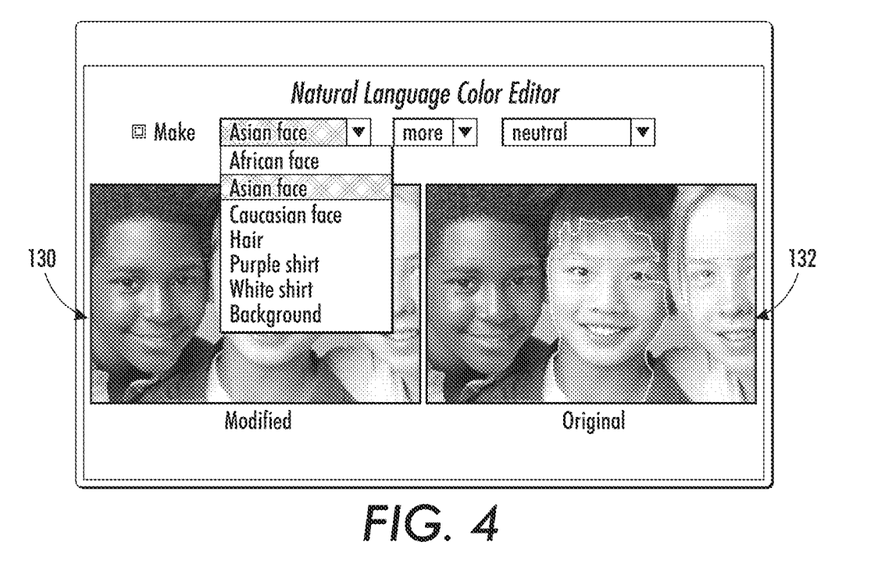
FIG. 4 is a screen shot illustrating features of various embodiments herein.

Those ordinarily skilled in the art would understand that the graphic user interface screenshots provided in FIGS. 3-4 are merely examples and that the methods and systems herein could use any form of presentation to allow the user to alter the appearance of the original image. Therefore, while a well-known ring-around approach is discussed above, any other image comparison approaches (whether currently known or developed in the future) can be used with the systems and methods herein. For example, different features can be included to allow the customer some additional simple adjustments (e.g., a sliding bar 124 for magnitude of change, in the upper right corner of FIG. 3) for more accurate capture of rendition preference.

Another example of the graphic user interface that could be used with embodiments herein is a natural language color editor (NLCE, see U.S. Patent Publication 2008/0007749) such as that shown in FIG. 4. Note that, with the exception of using customer images directly as probe images, the systems and methods herein can pre-process (manually or automatically) the database of probe images with segmentation and with semantic labels. With that, the natural language color editor can be greatly simplified with a few pre-populated field selections. Using the image 110 shown in FIG. 2 as an example, the natural language semantic labeled regions of the image relating to the pre-populated field selections may include African face (left), Asian face (center), Caucasian face (right), Hair, Purple shirt, White shirt, Background regions. An example of a simplified pull-down field for NLCE is shown in FIG. 4 where the left pull-down menu selects the Race 2 from image 132, which is then highlighted or outlined in image 130. When the other pull-down menus (pull-down menu to the right showing a "neutral" menu selection) are selected, for example, the appearance of the center face in the image can be changed accordingly and shown modified in image 130.

With such systems and methods, the number of probe images presented to the user during the survey can be much smaller than the total number of customer images (e.g. photo book or simply family photos) of the customer job. Thus, the survey that extracts the subjective CR preference is very simple, short, and relevant, which is useful since customers will be unwilling to spend a lot of time or effort on the survey.

The methods and systems herein incorporate the extracted CR preference parameters into a job-specific color rendition profile as mentioned above in item 106. To incorporate the extracted CR preference parameters into a job-specific color rendition profile, the methods and systems herein consider the data collected from the preference survey. In the case of the exemplary ring-around approach presented above, the adjustment is made according to the preferred color direction selected by the user (and magnitude if a GUI like that in FIGS. 3 and 4 is used) for each category of memory colors (skin tone, sky, grass, ocean/river, sand etc.). With the preferred color direction and magnitude for each category, the methods and systems herein refine a generic profile (that may have been based on the preferences of a large population) to an individualized profile matching the specific customer's subjective preferences.

Again, in item 108, the methods and systems herein can print this custom job with the resulting profile. Here, the systems and methods herein use the resulting preferred profile to render a custom print job, which provides preferred color rendition compared to a generic profile. Additionally, the preference data can be stored in a database and can be used for future printing for the same customer in various ways. For example, data from previous surveys can be used to speed up or eliminate the survey for the next purchase by that customer. With previous survey information, preferences are previously known and can be used as the initial state of the survey. Further, historical analyses can be used to smooth out the preference parameters over time (noise filtering due to survey variability), etc.

Figure 5:
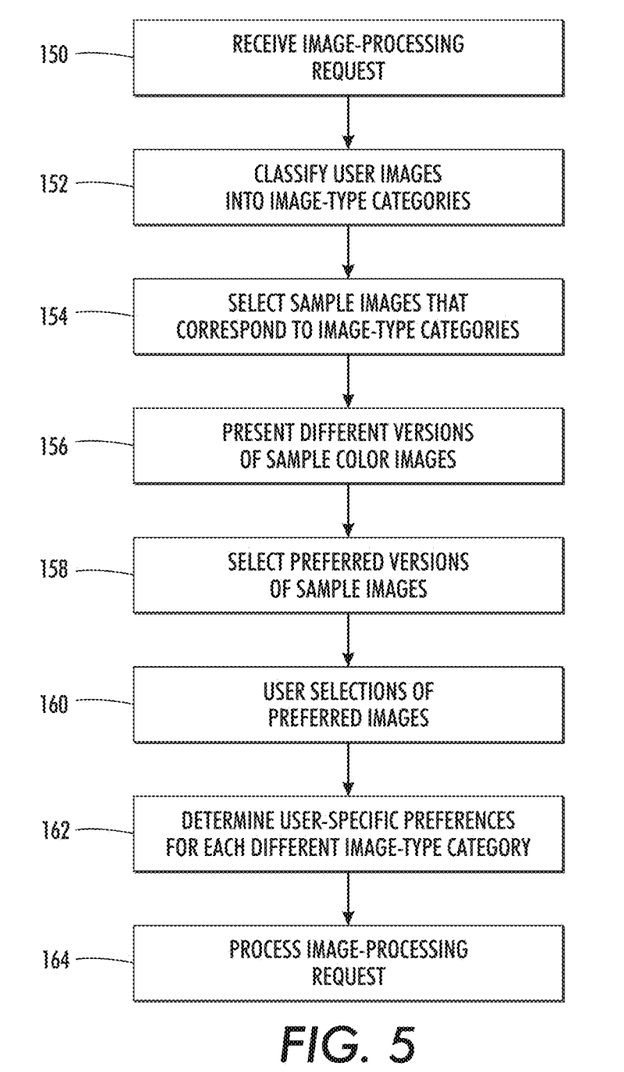
FIG. 5 is a flow diagram illustrating features of various embodiments herein.

FIG. 5 is flowchart illustrating an exemplary method herein. In item 150, this method receives an image-processing request relating to user images from a user into a graphic user interface of a computerized device. Such images can be any form of visual item, whether currently known or developed in the future, that can be output from a digital device (via graphic user interface, printer, input/output port, etc.). Therefore, for example, such "images" can be photographs, hand drawings/paintings, computer generated graphics, presentations, documents, screenshots, video, etc.

This method can classify the user images into image-element categories using a processor of the computerized device in item 152. The computerized device can also automatically obtain or select sample images that correspond to such image-element categories in item 154. The sample images can be taken from the images within the image-processing request (or a subset thereof), or can be standardized images that are different from the user images. Each of the sample images can represent at least one different image-element category. The processing in item 154 also can limit the sample images to only the image-element categories of the user images presented in the image-processing request.

When selecting a set of sample images, the user images can be classified based on image-element categories contained therein. In addition, when using a subset of the user images, each of the sample images represents at least one image-element category of the image-element categories.

Thus, as discussed above, FIG. 2 illustrates sample images (that are sometimes referred to herein as probe images) a skin tone image 110; a sky and grass image 112; an ocean and beach image 114, that are used to identify the customer's image rendition preference. Each sample image can represent an entire category of images. Such image element rendition categories can include skin color, sky color, grass color, water color, rock color, beach color, etc. Thus, a single sample image could be used to obtain a user's image rendition preference for an entire category of image elements. Further, the systems and methods herein can obtain all image characteristics (whether currently known or developed in the future). Therefore, while obtaining image element color user preferences is mentioned in many examples herein, the systems and methods herein can similarly obtain image element user preferences for contrast, tint, gloss, lightness, shadowing, etc., in additional to color (and can obtain all preferences in a single survey session, depending upon how many versions of the sample images are presented to the user during the survey session).

By using a single sample image (or a few sample images) for each category of image elements, much information can gained about each category of image elements. For example, the number of images presented to the user in the survey can be less than 10%, less than 5%, less than 1% of the total number of user images presented in the image processing request. The number of sample images presented is related to how diverse the user images are. Thus, if the user images are not diverse (and are mostly of the same scene or the same subject) there will not be as many different image elements relative to very diverse images. Thus, the number of sample images presented to the user will be lower if the user images contain many of the same elements and, therefore, the user images fall into a small number of image element categories. This allows the systems and methods herein to dramatically limit the number of images that a user will review, making the process of obtaining user image rendition preferences faster and more user-friendly.

The more user-friendly the process is, the more likely it is that the user will complete the survey; and, once the survey is completed, the images that are output from the systems herein are more closely aligned with the user's individual preferences (as opposed to average user preferences) which increases user satisfaction. Therefore, through the process of having a small number of images represent one or more categories of image elements, individual user preferences can be more easily obtained, thereby making the output images more pleasing to the individual user, and increasing the overall user satisfaction.

To obtain such individual image rendition preferences, the methods herein present, to the user, different versions of the sample images through the graphic user interface in item 156. The presentation in item 156 can include providing side-by-side images, sliding scales to change image feature rendition, natural-language choices to change image feature rendition, etc., to allow the user to select from among the different versions of the sample images.

In some embodiments, each of the different image-element categories can be represented by only one category-specific sample image, and different versions of each category-specific sample image are included in the sample images. Images can contain a single element (only water); but more commonly, images contain multiple image elements (e.g., image 112 in FIG. 2 includes the image elements of sky, clouds, building, grass, road, flowers, etc.). Thus, a single sample image can be used to represent one category of images or image elements. Alternatively, a single sample image can be used to represent multiple categories of images or image elements. Also, multiple images can be used to represent one or more categories of images or image elements.

Then, in item 158, this exemplary method requests the user to select preferred versions of the sample images from the different versions of the sample images, using the graphic user interface. In response, this method receives one or more user selections of preferred images, through the graphic user interface in item 160 (this can include receiving natural-language choices). Also, this process can be iterative, with each user selection providing different or more specific image rendition preferences, as indicated by the line returning to item 156 from item 160, in FIG. 5.

The user selection of preferred versions can be an iterative process, and the different versions of the sample images can be generated by varying the selected color rendition parameters according to preselected values or can be generated according to changes in color rendition parameters specified by the user. Such changes in color rendition parameters can be specified by the user using graphical user-interface controls and/or natural language processing. As shown, the multiple image-element categories can include human portraits, sky, grass, foliage, ocean and river scenes.

Further, this method determines user-specific preferences for each different image-element category based on the preferred images selected by the user, using the processor in item 162. The user-specific preferences are different for each user that selects the preferred images through the graphic user interface. Subsequently, this method can process the image-processing request using the processor in item 164. During the processing in item 164, this method alters the rendition of the user images according to the user-specific preferences for each the different image-element category. Such processing of the image-processing request in item 164 can include printing the user images, displaying the user images, etc., using the altered renditions of the images.

When altering the renditions of the user images according to the user-specific preferences, this processing in item 164 can modify the color rendition profile locally from original color values (e.g., lightness, chroma, and hue) of the image-element categories to the user-specific preferences via a smooth mapping process. The smooth mapping process can include, for example, a locally-weighted regression (LOESS model), a sigmoid function which changes values smoothly around pre-specified center values while leaving values away from the centers unchanged, etc.

The process shown in FIG. 5 is very user-friendly because it asks the user to review and comment on a small number of images relative to the number of images being processed and, thus, the process is more likely to be used by the consumer. This allows the systems and methods herein to process a large number of current (and potentially future) images in a way that matches an individual consumer's preferences (which may deviate substantially from the "average" consumer), thereby increasing user satisfaction when compared to systems that require a laborious image rendition input process, or compared to systems that simply use the "average" consumer preferences.

Figure 6:
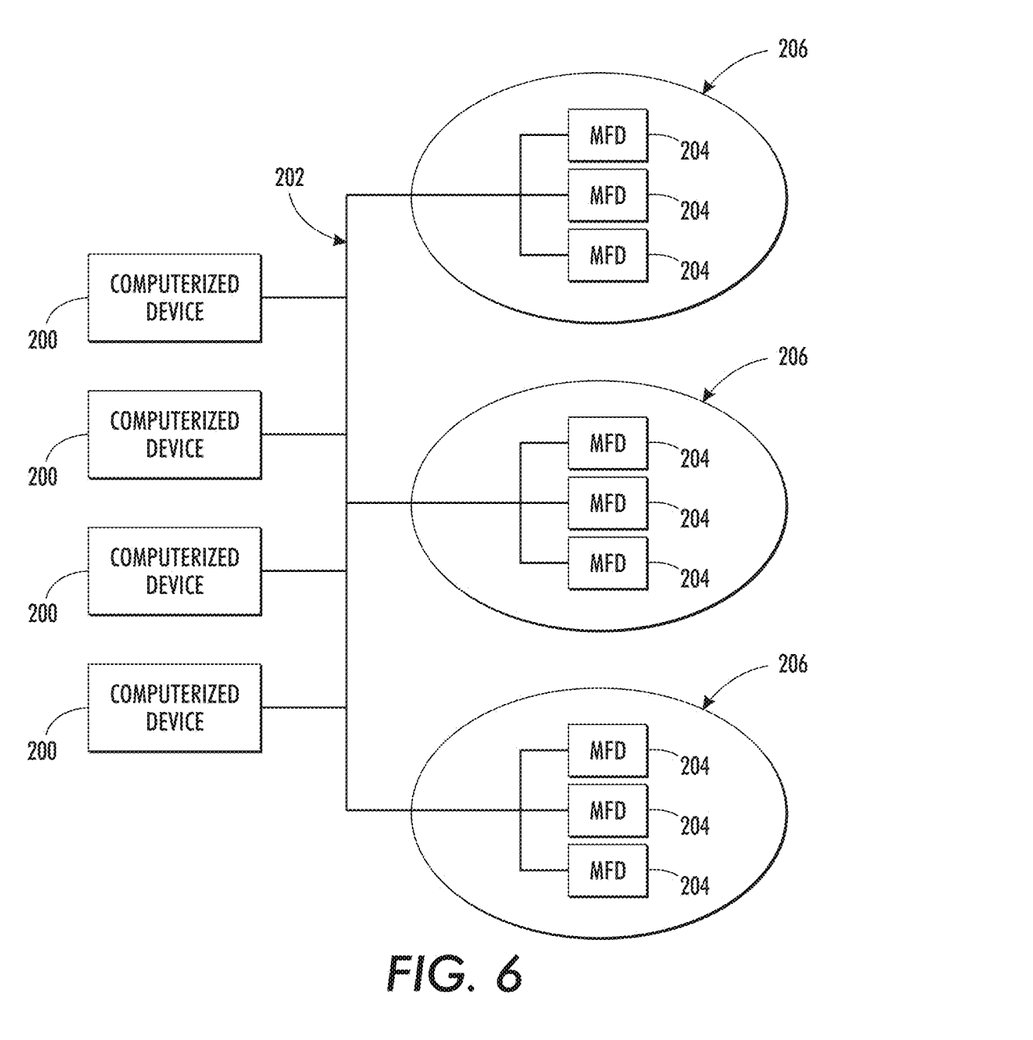
FIG. 6 is a schematic diagram of a system according to embodiments herein.

As shown in FIG. 6, exemplary system embodiments herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
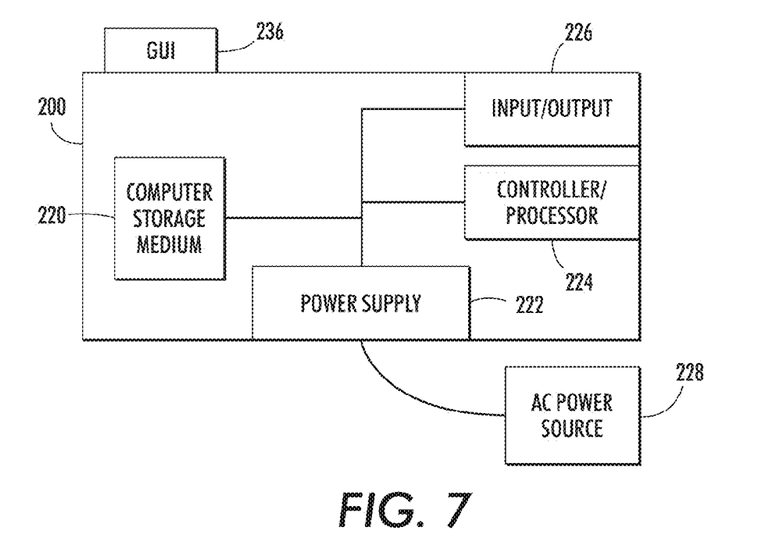
FIG. 7 is a side-view schematic diagram of a device according to embodiments herein.

FIG. 7 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 7, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 8:
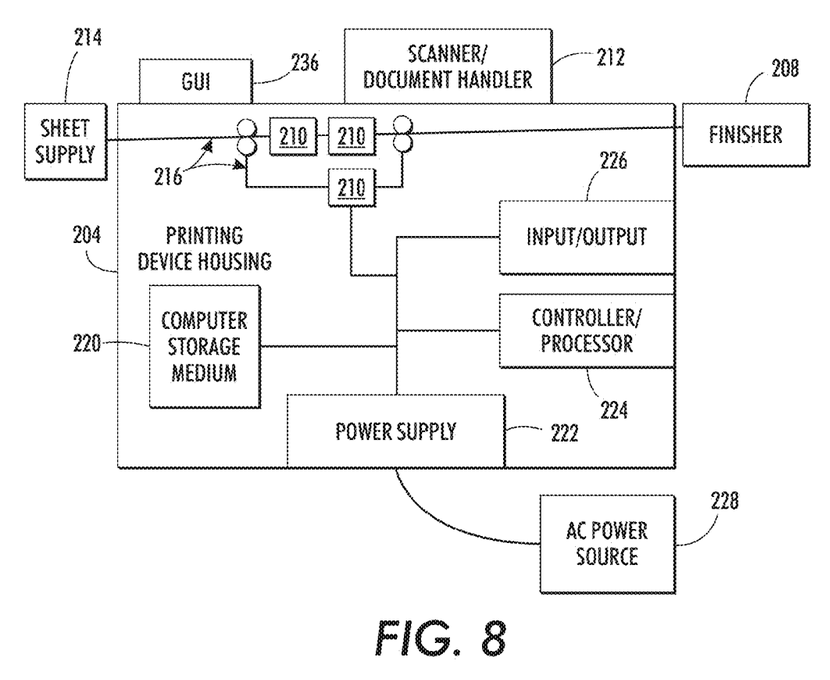
FIG. 8 is a side-view schematic diagram of a device according to embodiments herein.

FIG. 8 illustrates a computerized device that is a printing device 204, which can be used with embodiments herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art. The embodiments herein can encompass embodiments that print in color, monochrome, or handle color or monochrome image data. All foregoing embodiments are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim 1tself, steps or components of the embodiments herein cannot be implied or imported from any above example as limitations to any particular order, number, position, size, shape, angle, color, or material.

What is claimed is:

1. A method comprising:
   receiving an image-processing request relating to user images from a user;
   selecting a set of sample images;
   presenting, to said user, different versions of said sample images through a graphic user interface of a computerized device, each of said sample images containing at least one image-element category of multiple image-element categories;
   requesting said user to select preferred versions of said sample images from said different versions of said sample images, using said graphic user interface;
   receiving, in response to said requesting said user to select preferred versions of said sample images, a user selection of preferred images, through said graphic user interface;
   determining user-specific preferences for each said at least one image-element category based on said user selection of said preferred images using a processor of said computerized device; and
   processing said image-processing request using said processor, said processing of said image-processing request comprising altering renditions of said user images according to said user-specific preferences.

2. The method according to claim 1, said sample images comprising at least one of: a subset of said user images; and standardized images, said standardized images being different from said user images.

3. The method according to claim 1, said different versions of said sample images being generated by varying selected color rendition parameters according to preselected values.

4. The method according to claim 1, said different versions of said sample images being generated according to changes in color rendition parameters specified by said user, and said changes in color rendition parameters being specified by said user using one of: graphical user-interface controls, and natural language processing.

5. The method according to claim 1, said selecting a set of sample images further comprising:
   classifying said user images based on image-element categories contained therein; and
   selecting a set of sample images, being a subset of said user images, where each of said sample images represents at least one image-element category of said image-element categories.

6. The method according to claim 1, said selecting a set of sample images further comprising:
   classifying said user images based on image-element categories contained therein; and
   selecting a set of sample images, being a subset of standardized images, where each of said sample images represents at least one image element category of said image-element categories.

7. The method according to claim 1, said altering renditions of said user images according to said user-specific preferences for each said at least one image-element category comprising:

modifying a color rendition profile locally from original color values of said at least one image-element categories to said user-specific preferred color values via a smooth mapping process.

8. The method according to claim 7, said smooth mapping process comprising at least one of:
a locally-weighted regression (LOESS model), and
a sigmoid function which change values smoothly around pre-specified center values while leaving values away from said centers unchanged.

9. A method comprising:
receiving an image-processing request relating to user images from a user into a graphic user interface of a computerized device;
classifying said user images based on image-element categories contained therein, using a processor of said computerized device;
selecting sample images that correspond to said image-element categories of said user images, each of said sample images representing at least one image-element category of said image-element categories;
presenting, to said user, different versions of said sample images through said graphic user interface;
requesting said user to select preferred versions of said sample images from said different versions of said sample images, using said graphic user interface;
receiving, in response to said requesting said user to select preferred versions of said sample images, a user selection of preferred images, through said graphic user interface;
determining user-specific preferences for each said at least one image-element category based on said user selection of said preferred images using said processor; and
processing said image-processing request using said processor, said processing of said image-processing request comprising altering renditions of said user images according to said user-specific preferences for each said at least one image-element category.

10. The method according to claim 9, said sample images comprising at least one of: a subset of said user images; and standardized images, said standardized images being different from said user images.

11. The method according to claim 9, said different versions of said sample images being generated by varying selected color rendition parameters according to preselected values.

12. The method according to claim 9, said different versions of said sample images being generated according to changes in color rendition parameters specified by said user, and said changes in color rendition parameters being specified by said user using one of: graphical user-interface controls, and natural language processing.

13. The method according to claim 9, said selecting a set of sample images further comprising:
selecting a set of sample images, being a subset of said user images, where each of said sample images represents at least one image-element category of said image-element categories.

14. The method according to claim 9, said selecting a set of sample images further comprising:
selecting a set of sample images, being a subset of standardized images, where each of said sample images represents at least one image element category of said image-element categories.

15. The method according to claim 9, said altering renditions of said user images according to said user-specific preferences for each said at least one image-element category comprising:
modifying a color rendition profile locally from original color values of said at least one image-element categories to said user-specific preferred color values via a smooth mapping process.

16. The method according to claim 15, said smooth mapping process comprising at least one of:
a locally-weighted regression (LOESS model), and
a sigmoid function which change values smoothly around pre-specified center values while leaving values away from said centers unchanged.

17. A computerized device comprising:
a processor
said processor receiving an image-processing request relating to user images from a user, and selecting a set of sample images; and
a graphic user interface operatively connected to said processor,
said graphic user interface presenting different versions of sample images to a user,
each of said sample images containing at least one image-element category of multiple image-element categories,
said graphic user interface requesting said user to select preferred versions of said sample images from said different versions of said sample images,
said graphic user interface receiving, in response to said requesting said user to select preferred versions of said sample images, a user selection of preferred images,
said processor determining user-specific preferences for each said at least one image-element category based on said user selection of said preferred images,
said processor processing said image-processing request, and
said processing of said image-processing request comprising altering renditions of said user images according to said user-specific preferences.

18. The computerized device according to claim 17, said sample images comprising at least one of: a subset of said user images; and standardized images, said standardized images being different from said user images.

19. The computerized device according to claim 17, said user selection of preferred versions comprising an iterative process.

20. The computerized device according to claim 17, said different versions of said sample images being generated by varying selected color rendition parameters according to preselected values.

21. The computerized device according to claim 17, said different versions of said sample images being generated according to changes in color rendition parameters specified by said user, and said changes in color rendition parameters being specified by said user using one of: graphical user-interface controls, and natural language processing.

22. The computerized device according to claim 17, said presenting different versions of sample images further comprising:
said processor classifying said user images based on image-element categories contained therein; and
said processor selecting a set of sample images, being a subset of said user images, where each of said sample images represents at least one image-element category of said image-element categories.

23. The computerized device according to claim 17, said presenting different versions of sample images further comprising:
   said processor classifying said user images based on image-element categories contained therein; and
   said processor selecting a set of sample images, being a subset of standardized images, where each of said sample images represents at least one image element category of said image-element categories.

24. The computerized device according to claim 17, said altering renditions of said user images according to said user-specific preferences for each said at least one image-element category comprising:
   said processor modifying a color rendition profile locally from original color values of said at least one image-element category to said user-specific preferred color values via a smooth mapping process, and
   said smooth mapping process comprising at least one of:
      a locally-weighted regression (LOESS model), and
      a sigmoid function which changes values smoothly around pre-specified center values while leaving values away from said centers unchanged.

25. A non-transitory computer storage medium readable by a computerized device, said non-transitory computer storage medium storing instructions executable by said computerized device to cause said computerized device to perform a method comprising:
   receiving an image-processing request relating to user images from a user;
   selecting a set of sample images;
   presenting, to said user, different versions of said sample images through a graphic user interface of a computerized device, each of said sample images being classified into at least one image-element category of multiple image-element categories;
   requesting said user to select preferred versions of said sample images from said different versions of said sample images, using said graphic user interface;
   receiving, in response to said requesting said user to select preferred versions of said sample images, a user selection of preferred images, through said graphic user interface;
   determining user-specific preferences for each said at least one image-element category based on said user selection of said preferred images using a processor of said computerized device; and
   processing said image-processing request using said processor, said processing of said image-processing request comprising altering renditions of said user images according to said user-specific preferences.

* * * * *